United States Patent
Dix et al.

(10) Patent No.: US 12,264,226 B2
(45) Date of Patent: Apr. 1, 2025

(54) BLOWING AGENTS IN POLYMER FOAM PROCESSING SYSTEMS

(71) Applicant: Trexel, Inc., Wilmington, MA (US)

(72) Inventors: Samuel Edward Dix, Newton, NH (US); Levi A. Kishbaugh, Groveland, MA (US)

(73) Assignee: Trexel, Inc., Wilmington, MA (US)

( * ) Notice: Subject to any disclaimer, the term of this patent is extended or adjusted under 35 U.S.C. 154(b) by 0 days.

(21) Appl. No.: 17/745,766

(22) Filed: May 16, 2022

(65) Prior Publication Data

US 2023/0113531 A1    Apr. 13, 2023

Related U.S. Application Data

(63) Continuation of application No. 16/447,201, filed on Jun. 20, 2019, now Pat. No. 11,332,593, which is a continuation-in-part of application No. 15/926,882, filed on Mar. 20, 2018, now abandoned, and a continuation-in-part of application No. 15/909,873, filed on Mar. 1, 2018, now Pat. No. 11,559,927.

(51) Int. Cl.
*C08J 9/08* (2006.01)
*C08J 9/12* (2006.01)

(52) U.S. Cl.
CPC .............. *C08J 9/122* (2013.01); *C08J 9/08* (2013.01); *C08J 2201/03* (2013.01)

(58) Field of Classification Search
CPC ........ C08J 9/08; C08J 9/122; C08J 2203/184; C08J 2201/03; C08J 2203/02; C08J 2203/06; B29C 44/421
See application file for complete search history.

(56) References Cited

U.S. PATENT DOCUMENTS

| | | | |
|---|---|---|---|
| 4,211,523 A * | 7/1980 | Hunerberg | B29C 44/3446 261/45 |
| 4,877,815 A * | 10/1989 | Buckmaster | C08J 9/0033 521/85 |
| 6,593,384 B2 | 7/2003 | Anderson et al. | |
| 11,332,593 B2 | 5/2022 | Dix et al. | |
| 2004/0212118 A1 | 10/2004 | Vadala, Jr. et al. | |
| 2016/0090458 A1 | 3/2016 | Lindenfelzer et al. | |

OTHER PUBLICATIONS

International Search Report and Written Opinion for International Application No. PCT/US2020/038472 dated Sep. 28, 2020.

* cited by examiner

*Primary Examiner* — Monica A Huson
*Assistant Examiner* — Kelsey C Grace
(74) *Attorney, Agent, or Firm* — Wolf, Greenfield & Sacks, P.C.

(57) ABSTRACT

Methods and systems that include introducing blowing agent into a hopper of a polymeric foam processing system.

5 Claims, 3 Drawing Sheets

BLOWING AGENTS IN POLYMER FOAM PROCESSING SYSTEMS

RELATED APPLICATIONS

This application is a continuation of U.S. patent application, Jun. 20, 2019, which is a continuation-in-part of U.S. patent application Ser. No. 15/926,882, filed Mar. 20, 2018, and is a continuation-in-part of U.S. patent application Ser. No. 15/909,873, filed Mar. 1, 2018, both of which are incorporated herein by reference in their entireties for all purposes.

TECHNICAL FIELD

The present application relates generally to polymer foam processing and, more particularly, to methods and systems that include introducing blowing agent into a hopper of a polymeric foam processing system.

BACKGROUND

Polymeric foams include a plurality of voids, also called cells, in a polymer matrix. Polymeric foams are processed using a variety of techniques. For example, polymeric foams can be processed by injecting a physical blowing agent into the polymeric material within an extruder. For instance, many conventional systems inject blowing agent through a blowing agent port in the barrel of the extruder into a fluid stream of polymeric material within the extruder. The blowing agent may be mixed with the polymeric material to form a solution within the extruder. The solution may be, for example, injected into a mold to form an injection molded polymeric foam article. Such conventional systems may require modifications to standard extruder equipment (e.g., to extend length of the barrel to ensure sufficient mixing, to form a blowing agent port, etc.) and/or utilize relatively expensive equipment (e.g., blowing agent mass flow meter) to control the flow and introduction of blowing agent into the extruder.

Other prior art systems have attempted to simplify the design of polymer foam processing systems and reduce their costs. For example, certain systems have introduced physical blowing agent into a hopper of the extruder. Such systems generally have not controlled the amount of blowing agent introduced into the polymeric material. For certain foam processes, such an approach to blowing agent delivery may be adequate. However, in other processes that require relatively precise control over blowing agent delivery, such an approach may not be adequate.

Accordingly, there is a need for new blowing agent introduction techniques that may be used with polymer foam systems and methods.

SUMMARY

Methods and systems including introducing blowing agents into a hopper of a polymeric foam processing system are described.

In one aspect, a method is provided. The method comprises providing a hopper of a polymeric foam processing system. The method further comprises supplying polymeric material to the hopper, supplying chemical blowing agent to the hopper and supplying physical blowing agent to the hopper. The method further comprises supplying polymeric material, chemical blowing agent and physical blowing agent to an inlet of an extruder including a screw configured to rotate in a barrel. The method further comprises conveying a mixture of polymeric material, chemical blowing agent and physical blowing agent in a downstream direction in the extruder. The method further comprises accumulating a shot of the mixture of polymeric material and blowing agent and injecting the shot into a mold to form a molded polymeric foam article.

In one aspect, a system is provided. The system comprises an extruder including a screw configured to rotate in a barrel to convey a mixture of polymeric material and blowing agent in a downstream direction in a polymer processing space defined between the screw and the barrel. The system further comprises a mold connected to an outlet of the extruder. The screw is configured to periodically move in a downstream direction in the barrel to inject a shot of the mixture of polymeric material and blowing agent into the mold. The system further comprises a hopper configured to hold polymeric material pellets and blowing agent in a chamber volume. The hopper includes at least one inlet connectable to a source of the blowing agent. The hopper includes an outlet connectable to the polymer processing space in the extruder. The system further comprises a pressure regulator constructed and arranged to control the pressure of blowing agent supplied to the hopper. The system further comprises at least one processor and at least one storage medium having encoded thereon executable instructions that, when executed by the at least one processor, cause the at least one processor to carry out a method which comprises controlling a pressure of the blowing agent supplied to the hopper to a desired pressure using the pressure regulator based, at least in part, on the desired weight percentage of blowing agent in the shot of the mixture of polymeric material and blowing agent.

In one aspect, a method is provided. The method comprises providing a hopper configured to hold polymeric material pellets and supplying blowing agent to the hopper at a desired blowing agent pressure based, at least in part, on a desired weight percentage of blowing agent in the shot. The method further comprises supplying blowing agent and the polymeric material pellets to an inlet of an extruder including a screw configured to rotate in a barrel. The method further comprises conveying a mixture of polymeric material and the blowing agent in a downstream direction in the extruder and accumulating a shot of the mixture of polymeric material and blowing agent. The method further comprises injecting the shot into a mold to form a molded polymeric foam article.

In one aspect, a system is provided. The system includes an extruder including a screw configured to rotate in a barrel to convey a mixture of polymeric material and blowing agent in a downstream direction in a polymer processing space defined between the screw and the barrel. The system further includes a mold connected to an outlet of the extruder. The screw is configured to periodically move in a downstream direction in the barrel to inject a shot of the mixture of polymeric material and blowing agent into the mold. The system further comprises a blowing agent introduction system including a source of blowing agent and a pressure regulator. The system further comprises a hopper including a chamber volume having a port fluidly connected to the source of blowing agent. The hopper is configured to hold polymeric material pellets and blowing agent in a chamber volume. The hopper includes a first outlet configured to supply polymeric material pellets and blowing agent to the polymer processing space in the extruder. The system is configured to recycle blowing agent in the chamber volume to a location in the blowing agent introduction system upstream of the pressure regulator.

In one aspect, a system is provided. The system includes an extruder including a screw configured to rotate in a barrel to convey a mixture of polymeric material and blowing agent in a downstream direction in a polymer processing space defined between the screw and the barrel. The system further includes a mold connected to an outlet of the extruder. The screw is configured to periodically move in a downstream direction in the barrel to inject a shot of the mixture of polymeric material and blowing agent into the mold. The system further includes a blowing agent introduction system including a source of blowing agent and a hopper including at least a first chamber volume and a second chamber volume. At least one of the first or the second chamber volumes are configured to connect to the source of blowing agent and to hold polymeric material pellets and blowing agent.

Other aspects and features will become apparent from the following detailed description of the invention when considered in conjunction with the accompanying drawings.

DETAILED DESCRIPTION

Methods and systems that include introducing blowing agent into a hopper of a polymeric foam system are described. The methods and systems may include introducing chemical blowing agent, as well as physical blowing agent, into the hopper. It has been observed that introducing both chemical and physical blowing agents into the hopper may be particularly advantageous in some cases. For example, using physical blowing agent may reduce the amount of chemical blowing agent that otherwise would be used to achieve a certain density reduction in the resulting foamed article which can lead to cost savings. Also, using chemical blowing agent may reduce the pressure and/or amount of physical blowing agent required to achieve a certain density reduction and/or article quality (e.g., lack of warp). Such reduction in pressure and/or amount of physical blowing agent can lead to blowing agent cost savings and/or the ability to use less complicated and expensive equipment (e.g., gas seals). The methods and systems are particularly well suited for processes that produce injection molded polymeric foam articles.

In some embodiments, the methods may utilize a control system that enhances control over the amount of physical blowing agent (e.g., nitrogen, carbon dioxide) introduced into the polymeric material being processed by the system. As described further below, the system may control the amount of physical blowing agent introduced, in part, by controlling the pressure of blowing agent supplied to the hopper to a desired amount. The desired pressure may be based, at least in part, on the desired weight percentage of physical blowing agent in the polymeric material being processed. As described further below, the methods may determine the desired blowing agent pressure from a variety of additional inputs which may relate to the blowing agent (e.g., blowing agent type), desired article characteristics (e.g., article weight), polymer characteristics (e.g., polymer type, polymer pellet bulk density) and equipment design (e.g., hopper chamber volume). In some embodiments, the methods and systems are designed to recycle blowing agent to reduce the amount of unused blowing agent. The methods and systems may also include a multi-chamber hopper design that facilitates re-filling the chamber(s) with polymeric material pellets, for example, when a chamber is empty.

Figure 1:
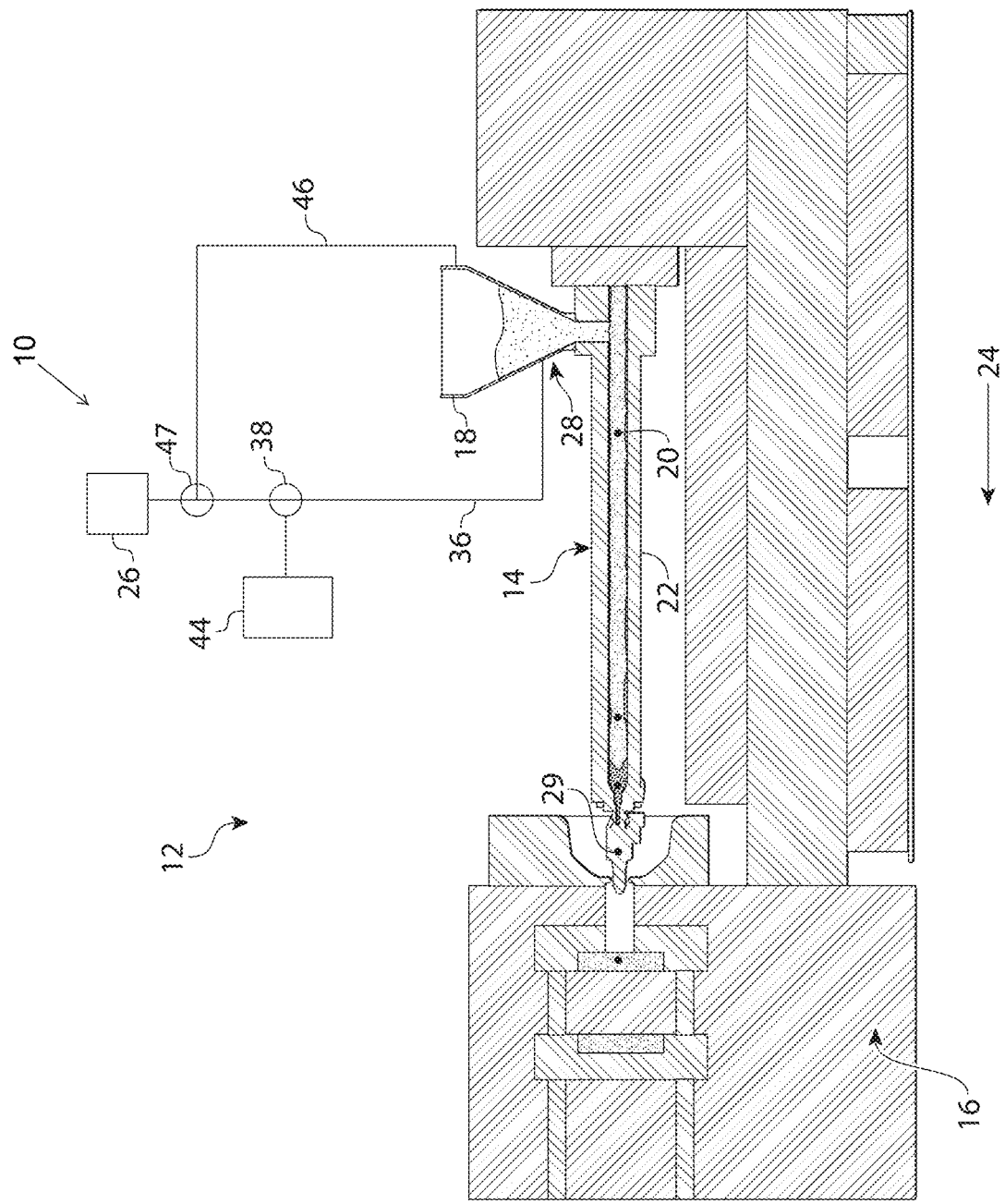
FIG. 1 schematically illustrates a polymer foam processing system according to an embodiment.

Referring to FIG. 1, a blowing agent introduction system 10 is used to deliver physical blowing agent to a polymer processing system 12. In this embodiment, system 12 is an injection molding system that includes an extruder 14 and a mold 16. Polymeric material (e.g., in the form of pellets) is provided to a hopper 18. As described further below, chemical blowing agent is also provided to the hopper. The hopper supplies the chemical blowing agent, physical blowing agent and polymeric material to the extruder.

The extruder includes a screw 20 designed to rotate within a barrel 22 to process the polymeric material. Heat (e.g., provided by heaters on the extruder barrel) and shear forces (e.g., provided by the rotating screw) act to melt the polymeric material to form a fluid polymeric stream which is conveyed in a downstream direction in the extruder by rotation of the screw. Such heat and shear forces also cause the chemical blowing agent to react (e.g., by decomposing) to form carbon dioxide which may be present in the fluid stream in the supercritical state within the extruder. The physical blowing agent (e.g., nitrogen) may also be present in the fluid stream in the supercritical state within the extruder.

In some embodiments, the mixture is a single-phase solution with the physical blowing agent being dissolved in the polymeric material prior to injection into the mold. In the illustrated embodiment, a valve 29 is arranged between the outlet of the extruder and the inlet of the mold. A shot of the mixture (e.g., single-phase solution) may be accumulated downstream of the screw within the extruder causing the screw to retract in an upstream direction within the barrel. When suitable conditions have been reached (e.g., after a predetermined time period, at a predetermined screw position, etc.), the screw stops retracting and rotating to end the plastication period of the molding cycle. During the injection period of the molding cycle, the screw may be forced downstream within the barrel to inject the mixture into a cavity of the mold when valve 29 opens. The mixture is subjected to a pressure drop during injection which nucleates a large number of cells and a polymer foam article is formed in the mold. The screw may begin to rotate once again to begin another molding cycle. The method is typically repeated to produce multiple polymeric foam articles.

It should also be understood that not all methods described herein involve formation of a single-phase solution and that certain methods may involve injection of a two-phase mixture (e.g., polymeric material and blowing agent) into the mold. It may be preferred in certain embodiments that produce microcellular foam articles, as described further below, to form a single-phase solution which is nucleated upon injection into the mold. Suitable processes for forming single-phase solutions and nucleating upon injection into the mold have been described in commonly-owned U.S. Pat. No. 6,884,823 which is incorporated herein by reference above in its entirety.

It should be understood that the polymer foam processing system may include a number of conventional components not illustrated in the figure. Though the physical blowing agent introduction system is illustrated as being used in conjunction with an injection molding system, it should be understood that the blowing agent introduction system may be used in conjunction with any other polymer processing system into which blowing agent is introduced including blow molding systems.

In general, methods described herein may utilize any suitable chemical blowing agent. For example, suitable chemical blowing agent may be capable of producing carbon dioxide under conditions in the extruder. The chemical blowing agent may undergo a reaction (e.g., a decomposition reaction) to form carbon dioxide upon being heated in the extruder. Suitable chemical blowing agents may include acids and/or alkalis. In some embodiments, suitable chemical blowing agent may comprise citric acid, sodium bicarbonate, monosodium citrate, dinitroso pentamethylenetetramine (DPT), oxybis (benzenesulfonyl hydrazide) (OBSH), p-toluenesulfonyl hydrazide (TSH), p-toluenesulfonyl semicarbazide (TSS) and calcium carbonate. It should be understood that the reactions that produce carbon dioxide may also produce other by-products which may be detectable in the final molded article.

As described herein, the inventors have appreciated that using certain amounts of chemical blowing agent (e.g., in combination with certain amounts of nitrogen physical blowing agent) may be preferred to form injection molding articles having desirable characteristics. For example, it may be preferred for the weight percentage of chemical blowing agent to be between about 0.10 and 2.0 weight percent based on the total weight of the polymeric material. In some of these embodiments, the weight percentage of the chemical blowing agent may be greater than or equal to 0.3 weight percent or greater than or equal 0.50 weight percent based on the total weight of the polymeric material; and, in some embodiments, the weight percentage may be less than or equal to 2.0 weight percent and/or less than or equal to 1.0 and/or less than or equal to 0.5 weight percent based on the total weight of polymeric material. It should be understood that any suitable ranges defined by the above-noted minimum and maximum values may be used (e.g., between 0.30 weight percent and 2.0 weight percent).

The chemical blowing agents used in the methods described herein may have any suitable form. In some cases, the chemical blowing agents may be in the form of pellets. In some cases, the chemical blowing agents may be in the form of particles. Other forms may also be also suitable such as flakes, powder or liquid. It should also be understood that the pellets and/or particles (or other forms) may include other components (e.g., non-reactive components) in addition to the chemical blowing agent. In some cases, the particles may have small particle sizes such as less than 10 micron and/or less than 1 micron. For example, some such chemical blowing agent particles have been described in U.S. Pat. No. 8,563,621 which is incorporated herein by reference in its entirety.

The physical blowing agent introduction system includes a physical blowing agent source 26 connectable to one or more port(s) 28 that are connectable to a chamber volume in the hopper. Conduit 36 is used to connect various components of the introduction system and to provide a pathway from the source to the blowing agent port(s). In the illustrative embodiment, upstream of the hopper, the blowing agent introduction system includes a pressure regulator 38 which, as described further herein, may be used to set the pressure of blowing agent supplied to the hopper at a desired level. In some embodiments, the blowing agent introduction system may include an accumulator 47 connected to an interchangeable bottle of blowing agent. In some embodiments, such as when a bottle does not supply blowing agent at a sufficiently high pressure, a pump may be connected to increase and/or maintain pressure of blowing agent in the introduction system. A control system 44 of the physical blowing agent introduction system may receive one or more inputs (e.g., relating to the desired amount of physical blowing agent introduced into the polymeric material which may be selected by an operator) and can provide output(s) to control the pressure regulator to supply a desired physical blowing agent pressure to the hopper. It should be understood that the blowing agent introduction system may include other standard components such as valves which may be used to selectively control blowing agent flow therepast. As described further below, the physical blowing agent introduction system may be configured to recycle residual blowing agent remaining in the hopper. It should also be understood that the physical blowing agent introduction system may have other designs and may not include all of the components (e.g., a control system) as described herein in all embodiments.

The control system may be any of the type known in the art such as a computing device, as described further below. As described above, the control system is capable of receiving input signals (e.g., from a user, from other components of the polymer processing system) and sending appropriate output signals (e.g., to components of the blowing agent introduction system such as the pressure regulator and/or the polymer processing system).

As noted above, techniques described herein may involve supplying physical blowing agent to the hopper at a desired pressure. Such an approach may be used to supply a desired amount of physical blowing agent into the polymeric material (e.g., desired weight percentage of physical blowing agent in the shot of polymeric material injected into the mold) which, for example, may be selected (e.g., as a value that is inputted to the system) by a user. As described further below, the desired pressure may be determined from a number of parameters in addition to the desired weight percentage of blowing agent in the polymeric material.

In some embodiments, the parameters may include characteristics relating to the equipment design. For example, the hopper chamber volume may be used as a parameter.

In some embodiments, the parameters may include characteristics relating to the polymeric material. For example, the type of polymer (e.g., resin type such as polypropylene, polyethylene, etc.), weight of polymeric material and/or polymeric material density may be used as parameter(s).

In some embodiments, the parameters may include characteristics relating to the injected molded article. For example, the weight (e.g., mass of polymeric material) of the injection molded article may be used.

In some embodiments, the parameters may include characteristics relating to the physical blowing agent. For example, the type of physical blowing agent (e.g., nitrogen, carbon dioxide) may be a parameter that is used in addition to the desired weight percentage of physical blowing agent in the polymeric material noted above.

In some embodiments, one aspect of determining the desired physical blowing agent pressure supplied to the hopper involves a step of determining the volume of physical blowing agent in the chamber in the hopper.

In some embodiments, one aspect of determining the desired physical blowing agent pressure supplied to the hopper involves a step of determining the amount of physical blowing agent that leaks out of the chamber volume of the hopper.

In some embodiments, one aspect of determining the desired physical blowing agent pressure supplied to the hopper involves a step of determining the maximum number of shots that may be achieved when using a hopper having a certain chamber volume.

The systems and methods described herein system may be used to introduce physical blowing agent into polymeric material within the extruder over a wide range of desired amounts. The desired physical blowing agent amount depends upon the particular process and is generally less than about 10% by weight of polymeric material and physical blowing agent. In many embodiments, the physical blowing agent level is less than about 5%, in others, less than about 3%, in others less than about 1%, in others less than about 0.5%, and still others less than about 0.1%, or even lower by weight of polymeric material and blowing agent mixture. As noted above, in some embodiments, it is possible to use relatively low amounts of physical blowing agent when chemical blowing agents are also used to achieve results that otherwise would require higher amounts of physical blowing agent. In some such embodiments, using low amounts of physical blowing agents has advantages such as cost savings.

During an illustrative process, the source provides physical blowing agent to the introduction system. The source may supply any type of physical blowing agent known to those of ordinary skill in the art including nitrogen, carbon dioxide, hydrocarbons, chlorofluorocarbons, noble gases and the like or mixtures thereof. The blowing agent may be supplied in any flowable physical state such as a gas, a liquid, or a supercritical fluid. According to one preferred embodiment, the source provides nitrogen as a blowing agent. In another preferred embodiment, the source provides carbon dioxide as a blowing agent. In certain embodiments, solely carbon dioxide or nitrogen is used. Blowing agents that are in the supercritical fluid state after injection into the extruder, (optionally, before injection as well) and in particular supercritical carbon dioxide and supercritical nitrogen, are preferred in certain embodiments.

In some embodiments and as illustrated, the system is designed to recycle unused blowing agent. For example, the system may be configured to recycle residual physical blowing agent remaining in the chamber volume in the hopper after the polymeric material in the hopper have been supplied to the extruder. In some cases, the residual blowing agent is removed from the hopper (e.g., via a port in the chamber volume) and re-circulated back into the blowing agent introduction system so that it may be used again. As shown in FIG. 1, the physical blowing agent may be re-circulated via conduit 46. Conduit 46, for example, re-introduces the physical blowing agent into the physical blowing agent introduction system at a position upstream of the pressure regulator. In some embodiments, the physical blowing agent is re-introduced into an accumulator of the physical blowing agent introduction system. In some embodiments, re-circulated physical blowing agent may be re-introduced into the chamber volume of the hopper that contains unused polymeric material (e.g., pellets).

Figure 2:
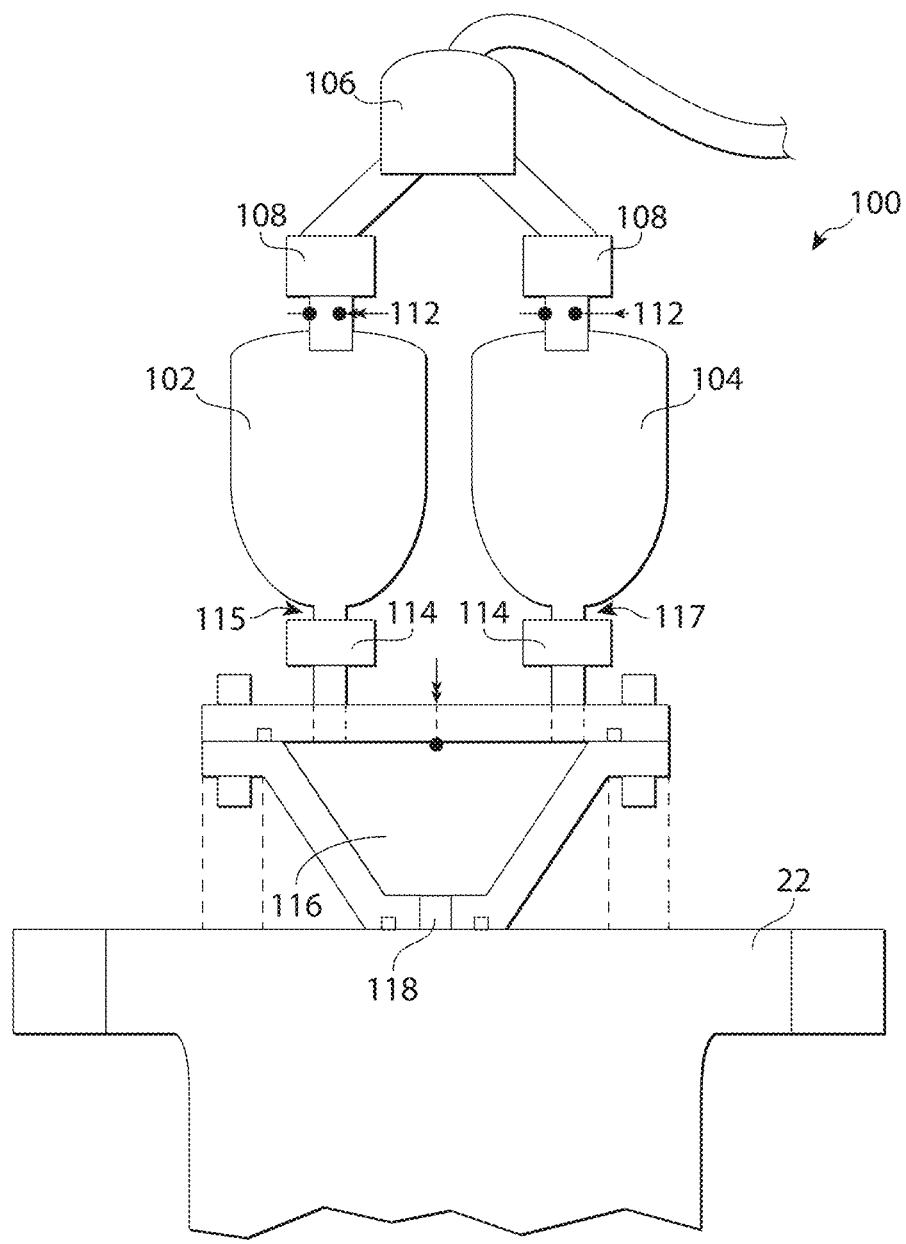
FIG. 2 schematically illustrates a multi-chamber hopper assembly according to an embodiment.

In some embodiments, the polymer foam processing system includes a hopper having multiple chambers. For example, FIG. 2 schematically illustrates a multi-chamber hopper assembly 100 according to an embodiment. The multi-chamber hopper assembly, as shown, includes a first chamber 102 and a second chamber 104. The first and second chambers are connected to a source of polymeric material (e.g., pellets) and/or a source of chemical blowing agent. In some cases, and as shown, the hopper assembly includes a loader 106 which is configured to contain polymeric material and chemical blowing agent upstream of the hopper chambers. The assembly may include respective shut-off valves 108 arranged between the loader and inlets to the chambers which may be controlled to permit or prevent polymeric material and chemical blowing agent from entering the chambers. The assembly may also include physical blowing agent inlets 112 which are fluidly connected to the blowing agent source. Shut-off valves may be associated with inlets 112 to permit or prevent physical blowing agent from flowing into the chambers. Shut-off valves 114 may also be positioned at respective outlets 115, 117 of the chambers. In the illustrative embodiment, the outlets are connected to a third chamber 116. During use, one of outlet shut-off valves is open to permit supply of polymeric material (and blowing agents) to the third chamber, while the other of the outlet shut-off valves is closed to prevent supply of polymeric material and blowing agents to the third chamber. When all of the polymeric material is used from one of the chambers the appropriate outlet valve is closed and the other outlet valve is opened to enable the other chamber to supply polymeric material and chemical blowing agent to the third chamber. The third chamber includes an outlet 118 that is connected to the polymer processing space so that polymeric material pellets and blowing agent may be supplied to the extruder. As illustrated, the third chamber also includes a physical blowing agent inlet that is fluidly connected to the blowing agent source.

Pressure may be maintained within the chambers that are supplying the polymeric material and blowing agent to the extruder and reduced in the other chamber. That is, when the outlet of the first chamber is open and the outlet of the second chamber is closed, pressure may be maintained in the first chamber and the third chamber and may be reduced in the second chamber (e.g., to atmosphere, for example, to enable polymeric material to be added to the second chamber). Similarly, when the outlet of the second chamber is open and the outlet of the first chamber is closed, pressure may be maintained in the second chamber and the third chamber and may be reduced in the first chamber (e.g., to atmosphere, for example, to enable polymeric material pellets to be added to the second chamber). When pressure is reduced in one or more chambers, it may be accomplished by releasing the physical blowing agent from the chamber. In some cases, the released physical blowing agent may be recycled as described above.

It should be understood that the multi-chamber hopper assembly may include additional components that are not illustrated. In some embodiments, blowing agent is not supplied to first chamber 102 or second chamber 104 and is only supplied to third chamber. In such embodiments, the first chamber and second chamber may not include blowing agent ports, while the third chamber may include a physical blowing agent port. It also should be understood that not all embodiments utilize a multi-chamber hopper assembly and that a more conventional (e.g., single chamber) hopper assembly may be used in some cases.

Any polymeric material suitable for forming polymeric foams may be used with the methods described herein. Such polymeric materials, in some cases, are thermoplastics which may be amorphous, semicrystalline, or crystalline materials. In some embodiments, semicrystalline or crystalline materials are preferred. Typical examples of polymeric materials used include polyolefins (e.g., polyethylene and polypropylene), styrenic polymers (e.g., polystyrene, ABS), fluoropolymers, polyamides, polyimides, polyesters, and/or mixtures of such polymeric materials. In some embodiments, polyolefin materials may be used. In some such embodiments, the polyolefin material may be a mixture of more than one type of olefin, or a mixture of one or more types of polyolefin and one or more types of non-polyolefin polymeric materials. The polymeric material used may depend upon the application in which the article is ultimately utilized.

In general, the polymeric foam articles have a certain cell size. In some embodiments, the methods described herein may be used to produce foam articles having a small cell size. For example, in some cases, the methods involve production of microcellular foam articles. The microcellular foam article may have an average cell size of less than 100 microns. In some cases, the microcellular foam articles have an average cell size of less than 75 microns. Average cell size may be determined by measuring a representative number of cells using microscopy (e.g., SEM) techniques. In some embodiments (including embodiments involving production of microcellular foam material), the cell size may vary across the thickness of the injection molded article. For example, the cell size at or near the center of the article may be larger than the cell size approaching edges of the article and/or edges of the foamed region of the article.

It should be understood that not all methods described herein involve producing microcellular foam and that, in some embodiments, articles having an average cell size of greater than 100 microns.

The injection molded polymeric foam articles may have a range of void volume percentages. As used herein, the void volume percentage is the percentage of the volume of an article occupied by voids. It can be measured by the following equation:

$$\text{Void volume \%} = 100 \times [1 - (\text{density of the polymer foam article}/\text{density of solid polymer})]$$

For example, if the foam article has a density of 0.85 g/cm$^3$ and the solid polymer has a density of 1.0 g/cm$^3$, then the percentage void volume is 15%. The particular void volume may depend upon the application. In some embodiments, the void volume percentage is relatively low. For example, the void volume percentage may be less than 20%, less than 15%, less than 12%, less than 10% or less than 5%. In some embodiments, the void volume may be greater than 2%; greater than 5%, greater than 8%, greater than 10% or greater than 15%. It should be understood that any suitable ranges defined by the above-noted minimum and maximum values may be used (e.g., between 2% and 15%, between 5% and 15%, between 8% and 12%, etc.).

In general, the injection molded polymeric foam articles may have any suitable wall thickness. As used herein, wall thickness refers to the predominant cross-sectional dimension across the thickness of the article. For example, the article thickness may be less than 5.0 mm, less than 3.0 mm, less than 2.5 mm, less than 2.0 mm or less than 1.0 mm. In some embodiments, the article thickness may be greater than 0.5 mm, greater than 1.0 mm or greater than 1.5 mm. It should be understood that any suitable ranges defined by the above-noted minimum and maximum values may be used (e.g., between 0.5 mm and 5 mm, between 0.5 mm and 3.0 mm, between 1.0 mm and 3.0 mm, etc.).

As described above, in some embodiments, the injection molded polymeric foam articles may have unfoamed skin region(s) extending from the exterior surfaces of the article (e.g., article surfaces that are in contact with the injection mold). The skin regions may surround (at least in part) a foamed interior region. The total skin thickness and/or percentage of total skin thickness compared to total wall thickness may be characterized using visual techniques (e.g., by eye and/or microscopy). The total skin thickness is the sum of the skin thicknesses across the cross-sectional thickness of the article.

In some embodiments, the total skin thickness may be greater than 100 microns, greater than 200 microns, greater than 250 microns, greater than 300 microns, greater than 400 microns or greater than 500 microns. In some embodiments, the total skin thickness may be less than 700 microns, less than 600 microns, less than 500 microns or less than 300 microns. It should be understood that any suitable ranges defined by the above-noted minimum and maximum values may be used (e.g., between 100 microns and 500 microns, between 250 microns and 700 microns, etc.).

In some embodiments, the percentage of total skin thickness compared to total wall thickness may be greater than 15%, greater than 25%, greater than 40%, greater than 50% or greater than 60%. In some embodiments, the percentage of total skin thickness compared to total wall thickness may be less than 70%, less than 50%, less than 40% or less than 25%. It should be understood that any suitable ranges defined by the above-noted minimum and maximum values may be used (e.g., between 25% and 70%, between 15% and 50%, etc.).

It should be understood that not all injection mold articles described herein have an identifiable skin. That is, such articles may comprise substantially entirely of a foamed structure.

The injection molded articles described herein can exhibit excellent properties including excellent mechanical properties such as high elongations. For example, the percent elongation at break (as measured by ASTM D638) may be greater than 5%, greater than 25%, greater than 50%, greater than 100%, or greater than 150%. In some embodiments, the percent elongation at break (as measured by ASTM D638) may be less than 200%, less than 150%, less than 100% or less than 50%. It should be understood that any suitable ranges defined by the above-noted minimum and maximum values may be used (e.g., between 5% and 200%, between 25% and 150%, etc.).

The desirable properties and characteristics enable the injection molded foam articles described herein to be used in a variety of applications. In particular, the articles may be used in a variety of consumer and industrial goods including automotive components and packaging.

In some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application. In other implementations, the functional facilities may be adapted to interact with other functional facilities in such a way as form an operating system. In other words, in some implementations, the functional facilities may be implemented alternatively as a portion of or outside of an operating system.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner, including as computer-readable storage media 806 of FIG. 3 described below (i.e., as a portion of a computing device 800) or as a stand-alone, separate storage medium. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Figure 3:
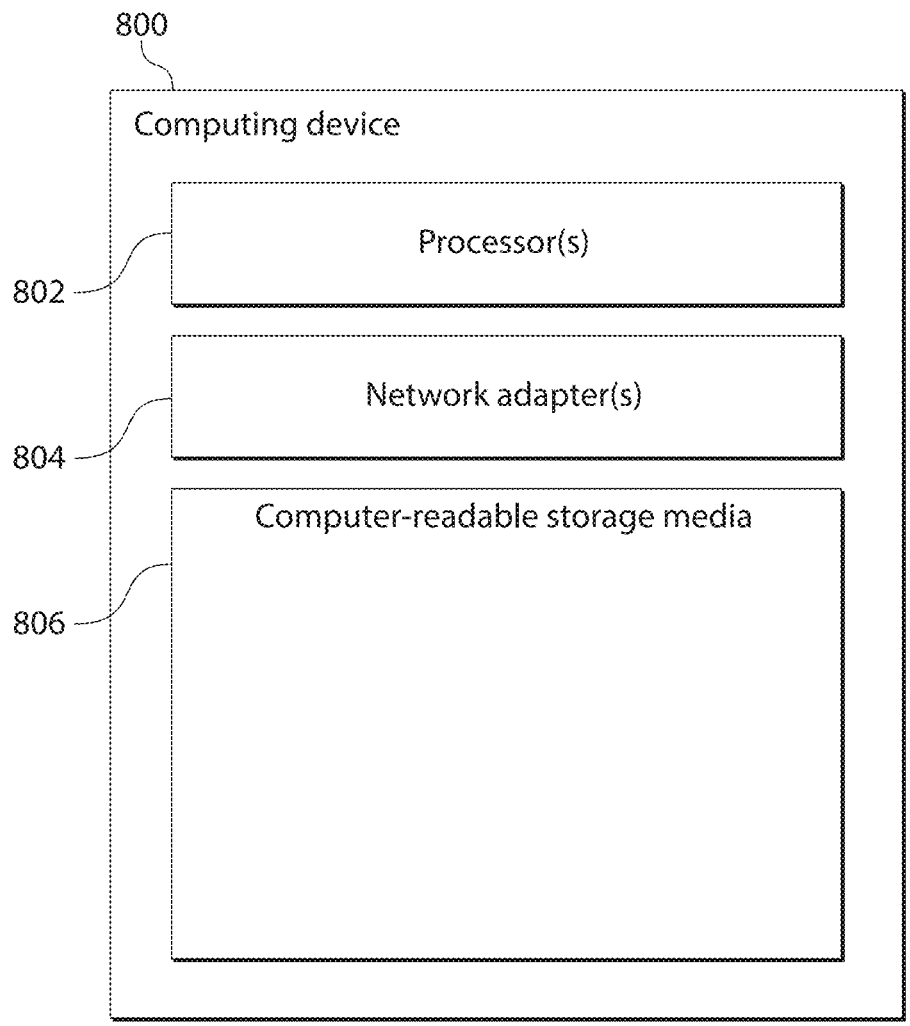
FIG. 3 schematically illustrates a computing device suitable for use in connection with a polymer foam processing system according to an embodiment.

In some, but not all, implementations in which the techniques may be embodied as computer-executable instructions, these instructions may be executed on one or more suitable computing device(s) operating in any suitable computer system, including the exemplary computer system of FIG. 3, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing devices (co-located or geographically distributed) dedicated to executing the techniques described herein, one or more Field-Programmable Gate Arrays (FPGAs) for carrying out the techniques described herein, or any other suitable system.

FIG. 3 illustrates one exemplary implementation of a computing device in the form of a computing device 800 that may be used in a system implementing techniques described herein, although others are possible. It should be appreciated that FIG. 3 is intended neither to be a depiction of necessary components for a computing device to operate in accordance with the principles described herein, nor a comprehensive depiction.

Computing device 800 may comprise at least one processor 802, a network adapter 804, and computer-readable storage media 806. Computing device 800 may be, for example, a desktop or laptop personal computer, a personal digital assistant (PDA), a smart mobile phone, a server, a wireless access point or other networking element, or any other suitable computing device. Network adapter 804 may be any suitable hardware and/or software to enable the computing device 800 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media 806 may be adapted to store data to be processed and/or instructions to be executed by processor 802. Processor 802 enables processing of data and execution of instructions. The data and instructions may be stored on the computer-readable storage media 806.

The data and instructions stored on computer-readable storage media 806 may comprise computer-executable instructions implementing techniques which operate according to the principles described herein. In the example of FIG. 3, computer-readable storage media 806 stores computer-executable instructions implementing various facilities and storing various information as described above. Computer-readable storage media 806 may store the various processes/facilities discussed above.

While not illustrated in FIG. 3, a computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The function and advantage of these and other embodiments of the present invention will be more fully understood from the examples below. The following example is intended to illustrate the benefits of the present invention, but does not exemplify the full scope of the invention and should not be considered limiting in this regard.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed:

1. A method comprising:
   providing a hopper of a polymer foam processing system;
   supplying polymeric material to the hopper;
   supplying chemical blowing agent to the polymeric material in the polymer foam processing system;
   supplying physical blowing agent comprising nitrogen to the polymeric material in the polymer foam processing system;
   conveying a mixture of the polymeric material, the chemical blowing agent and the physical blowing agent comprising nitrogen in a downstream direction in the extruder, wherein the nitrogen is present in an amount between 0.025 and 1.50 weight percent based on the total weight of polymeric material;
   decomposing the chemical blowing agent to form carbon dioxide that is present in an amount between 0.2 and 3.0 weight percent chemical blowing agent;
   accumulating a shot of the mixture of polymeric material and blowing agent; and
   injecting the shot into a blow mold to form a blow-molded polymeric foam article.

2. The method of claim 1, wherein the microcellular foam article has an average cell size of less than 100 micron.

3. The method of claim 1, wherein the physical blowing agent comprising nitrogen blowing agent is present in an amount between 0.25 and 1.00 weight percent based on the total weight of the polymeric material.

4. The method of claim 1, wherein the chemical blowing is present in an amount between 0.35 and 2.00 weight percent based on the total weight of the polymeric material.

5. The method of claim 1, wherein the blow-molded polymeric foam article comprises a semi-crystalline polymer.

* * * * *

UNITED STATES PATENT AND TRADEMARK OFFICE
CERTIFICATE OF CORRECTION

PATENT NO. : 12,264,226 B2
APPLICATION NO. : 17/745766
DATED : April 1, 2025
INVENTOR(S) : Samuel Edward Dix et al.

Page 1 of 1

It is certified that error appears in the above-identified patent and that said Letters Patent is hereby corrected as shown below:

In the Claims

Column 14, Claim 1, Lines 21-23, "to form carbon dioxide that is present in an amount between 0.2 and 3.0 weight percent chemical blowing agent;" should read --to form carbon dioxide, the weight percentage of chemical blowing agent to be between about 0.10 and 2.0 weight percentage based on the total weight of the polymeric material--

Signed and Sealed this
Second Day of September, 2025

Coke Morgan Stewart
*Acting Director of the United States Patent and Trademark Office*